United States Patent [19]
Mouton

[11] Patent Number: 5,156,001
[45] Date of Patent: Oct. 20, 1992

[54] FUEL SUPPLY CIRCUIT FOR A TUBO-ENGINE

[75] Inventor: Pierre C. Mouton, Grigny, France

[73] Assignee: Societe Nationale d'Etude et de Construction de Moteurs d'Aviation "S.N.E.C.M.A.", Paris, France

[21] Appl. No.: 746,992

[22] Filed: Aug. 19, 1991

[30] Foreign Application Priority Data

Aug. 22, 1990 [FR] France ................. 90 10545

[51] Int. Cl.⁵ ........................................... F02C 7/236
[52] U.S. Cl. .................................... 60/734; 60/39.33; 417/245
[58] Field of Search ............. 60/39.181, 39.281, 39.33, 60/734; 417/245, 405

[56] References Cited

U.S. PATENT DOCUMENTS

| | | |
|---|---|---|
| 2,916,875 | 12/1959 | Morley et al. ............ 60/39.281 |
| 4,205,945 | 6/1980 | Davis ........................ 417/245 |
| 4,339,917 | 7/1982 | LaGrone . | |
| 4,864,815 | 9/1989 | Cygnor ...................... 60/734 |

FOREIGN PATENT DOCUMENTS 735874 8/1955 United Kingdom .

Primary Examiner—Louis J. Casaregola
Attorney, Agent, or Firm—Oblon, Spivak, McClelland, Maier & Neustadt

[57] ABSTRACT

In order to limit the heating of fuel in the fuel supply circuit of an aircraft turbo-engine including a high pressure displacement pump driven by the turbo-engine, and an excess fuel return pipe having a pressure regulating valve in parallel with the high pressure pump, a driving unit, such as a turbine, is disposed in the return pipe downstream of the regulating valve to be driven by excess fuel flowing in the pipe. The driving unit may be drivingly connected directly to the drive shaft of the high pressure pump, or indirectly through a gear box through which the turbo-engine is also connected to the drive shaft.

4 Claims, 1 Drawing Sheet

FUEL SUPPLY CIRCUIT FOR A TUBO-ENGINE

BACKGROUND OF THE INVENTION

1. Field of the Invention

The invention relates to a fuel supply circuit for a turbo-engine such as may be used in the aeronautical industry.

2. Summary of the Prior Art

As shown very diagrammatically in FIG. 1 of the drawings, a conventional fuel supply circuit for a modern turbo-engine usually comprises a low pressure pump 12 fed with fuel via a pipe 10, and a high pressure displacement pump 16 of fixed capacity receiving fuel from the low pressure pump 12 via a pipe 14 and delivering the fuel to the turbo-engine via a pipe 18. The pumps 12 and 16 are driven by the turbo-engine, and the high pressure pump 16 is sized so as to ensure the supply of fuel at the time of heaviest demand, which generally occurs either when starting (subsonic operation of the turbo-engine) or at maximum speed (supersonic operation of the turbo-engine).

Accordingly the high pressure displacement pump 16 of the fuel supply circuit is oversized for all the other phases of flight, and particularly when the rotational speed of the turbo-engine is high and fuel consumption low. These conditions, in which the delivery rate of the high pressure pump 16 may be about 40 times higher than the rate of fuel consumption by the turbo-engine, occur generally in flight at high altitude and low speed.

The excess high pressure fuel delivered by the displacement pump 16 is then returned to the input of the pump via an excess fuel return pipe 22 containing a governer valve 24. On passing through this valve the pressure of the excess fuel flow is reduced from a high pressure to a low pressure by a simple pressure drop. The potential energy lost is converted into heat, and this contributes to the heating of the fuel in the fuel supply circuit.

This phenomenon, which is observed in all cases, is particularly noticeable in twin-spool bypass engines with high compression ratios, and can give rise to increases in the temperature of the fuel in the supply circuit of several tens of degrees. This excessive rise in temperature in the fuel supply circuit becomes a considerable drawback when it is realised that, in an aircraft, the fuel constitutes an efficient and easy means of cooling a great variety of systems.

In U.S. Pat. No. 4 339 917 has ben proposed to use part of the excess fuel available at the delivery of the high pressure displacement pump under certain flight conditions to actuate a turbine, the output shaft of which directly drives the rotor of the low pressure pump disposed upstream of the high pressure pump. In a fuel supply circuit constructed in this manner, part of the potential energy loss at the outlet of the high pressure pump is converted into mechanical energy, and the rise in fuel temperature is therefore lower than in the conventional fuel supply circuits described earlier. However, this solution is still not without drawbacks.

Indeed, since the low pressure pump of the fuel supply circuit will be driven by the turbine only when there is an excess of fuel delivered by the high pressure pump, which is not always the case, particularly on starting, it is necessary to use an oversize high pressure pump so that the low pressure pump is actuated immediately on starting. This oversizing of the high pressure pump results in a temperature increase in the fuel which cancels to a large extent the reduction obtained from the conversion of part of the potential energy available in the excess output of the high pressure pump into mechanical energy.

SUMMARY OF THE INVENTION

It is an object of the invention to provide a fuel supply circuit for a turbo-engine which permits an appreciable reduction in the heating of the fuel under those operating conditions in which the high pressure pump delivers the greatest amount of excess fuel, without requiring any oversizing of the high pressure pump relative to conventional circuits.

To this end, according to the invention, there is provided a fuel supply circuit for a turbo-engine, said circuit comprising a high pressure displacement pump, a drive shaft for said pump arranged to be driven by the turbo-engine, a return pipe for excess fuel delivered by said pump, said return pipe being disposed in parallel with said pump, pressure regulating means located in said return pipe, and at least one driving unit located in said return pipe downstream from said pressure regulating means and arranged to be driven by excess fuel flowing through said return pipe, said driving unit being drivingly connected to said drive shaft of said pump.

In a fuel supply circuit constructed in this way, the energy in the excess fuel available at the delivery of the high pressure displacement pump under certain flight conditions is partly converted into mechanical energy. The heating of the fuel due to the pressure drop through the resulting valve is therefore reduced. Moreover, this result is obtained without any need to oversize the high pressure pump, because the low pressure and high pressure pumps of the fuel supply circuit are driven by the turbo-engine as in conventional circuits.

Preferably, the driving unit is a turbine, and, depending on circumstances, the driving unit may be either directly mounted on the drive shaft of the high pressure pump, or mechanically connected to this drive shaft through a gear box through which the drive shaft is also driven by the turbo-engine.

DESCRIPTION OF THE PREFERRED EMBODIMENTS

Figure 1:
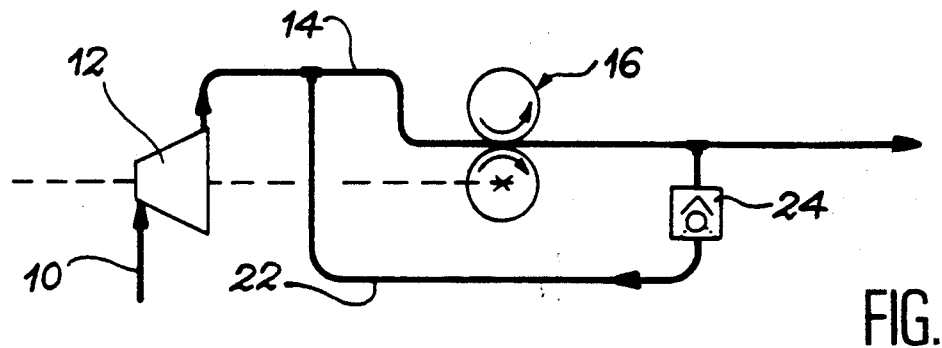
FIG. 1, as already mentioned, is a diagrammatic representation of a traditional fuel supply circuit for a turbo-engine.
Figure 2:
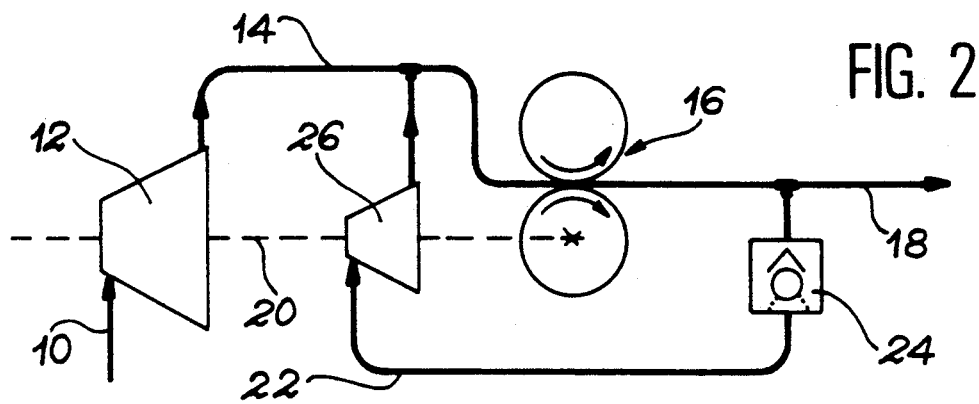
FIG. 2 is a diagrammatic view, comparable with that of FIG. 1, but representing one embodiment of a fuel supply circuit in accordance with the invention.

The fuel supply circuit shown in FIG. 2 comprises a pipe 10 along which fuel from the tanks (now shown) flows to the suction inlet of a low pressure pump 12, such as a centrifugal compressor. A pipe 14 connects the delivery outlet of the low pressure pump 12 to the suction inlet of a fixed capacity, high pressure displacement pump 16, such as a gear pump. The delivery outlet of the high pressure pump 16 is connected by a pipe 18 to the turbo-engine which is supplied by the circuit.

As in conventional fuel supply circuits, the low pressure pump 12 and the high pressure pump 16 are mechanically driven by the turbo-engine through a drive shaft represented diagrammatically by reference 20, this shaft 20 carrying both the rotor of the low pressure pump 12 and the driving gear of the gear pump 16.

Also in a conventional manner, a pipe 22 for the return of excess fuel is branched from the pipe 18 downstream of the outlet of the high pressure pump 16. This return pipe 22 is connected at its other end to the pipe 14 between the low pressure pump 12 and the high pressure pump 16, and includes a pressure regulating valve 24 which reduces, by simple pressure drop, the pressure of the excess fuel returned by the pipe 22 from upstream of the high pressure pump 16.

In accordance with the invention, a driving unit, constituted in the embodiment illustrated in FIG. 2 by a turbine 26, is located in the excess fuel return pipe 22 downstream of the pressure regulation valve 24. The rotor of this turbine 26 is mounted on the drive shaft 20 of the pumps 12 and 16.

The turbine 26 may be a centripetal or axial turbine. It may also be replaced by several turbines in series, all their rotors being secured on the driven shaft 20. Generally speaking, the driving unit constituted by the turbine 26 has a permeability as large as possible, so as to permit the throughput of the maximum flow of fuel returned through the pipe 22.

The driving unit constituted by the turbine 26 in the FIG. 2 embodiment is preferably arranged so that its energy output is optimized for the most critical heating point. Thus, the output of the turbine 26 may reach, for example, a maximum value of about 50% when the aircraft is flying at low speed and high altitude. Under these conditions the heating of the fuel may be reduced by half relative to that which would occur in conventional fuel supply circuits.

As a result of the arrangement which has just been described with reference to FIG. 2, it will be understood that part of the energy of the excess fuel delivered from the high pressure pump 16 is transferred as mechanical energy to the driving shaft 20 of the pumps 12 and 16 by the turbine 26. The result is that the thermal energy created by the pressure drop in the excess fuel flowing through the pressure regulating valve 24 is reduced relative to that in conventional circuits. By way of a non-limitative example, the temperature rise of the fuel may reach some 50° C. in a fuel supply circuit in accordance with the invention, whereas this temperature rise could reach about 80° C. in conventional circuits.

Figure 3:
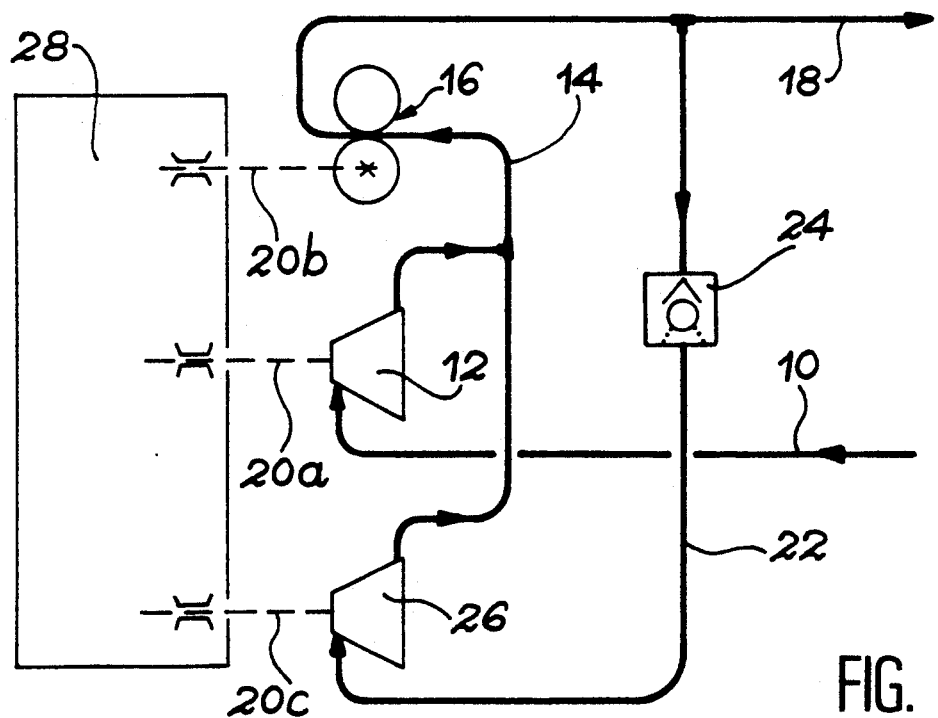
FIG. 3 is a view similar to that of FIG. 2, but showing an alternative embodiment of a fuel supply circuit in accordance with the invention.

Another embodiment of a fuel supply circuit in accordance with the invention is shown in FIG. 3. Basically, this circuit is the same as that of FIG. 2 in that it comprises the low pressure pump 12 supplied by the pipe 10, the high pressure displacement pump 16 supplied by the pipe 14, and the pipe 18 along which the fuel from the high pressure pump 16 is delivered to the turbo-engine. The FIG. 3 circuit also comprises the excess fuel return pipe 22, as well as the pressure regulating valve 24 and the turbine 26 mounted in this pipe 22.

Where the fuel supply circuit shown in FIG. 3 differs from that shown in FIG. 2 is that, instead of being mounted on a common drive shaft, the rotor of the low pressure pump 12, the drive-gear of the high pressure pump 16, and the rotor of turbine 26 are mounted on three separate shafts represented by 20a, 20b and 20c respectively. These three driving shafts are mechanically interconnected through a gear box 28. Thus, the driving shafts 20a and 20b of the low pressure pump 12 and the high pressure pump 16 are driven by the turbo-engine through the gear box 28, and the turbine shaft 20c is mechanically connected to the driving shafts 20a and 20b of the two pumps also through the gear box 28.

Accordingly, as in the embodiment described with reference to FIG. 2, the pressure drops in the flow of excess fuel from the delivery of the high pressure pump 16 is converted partly into mechanical energy in the turbine 26, so that the heating of the fuel is reduced compared to that in conventional fuel supply circuits.

Naturally, the invention is not limited to the embodiments which have been described above by way of examples, but covers all variations thereof. Thus, as has been mentioned already, the turbine 26 may be replaced by several turbines arranged in series, or by one or more technically equivalent drive units. Also, the pressure regulating valve 24 may be replaced by any pressure regulation means capable of performing the same function.

I claim:

1. A fuel supply circuit for a turbo-engine, said circuit comprising a high pressure displacement pump, a drive shaft for said pump arranged to be driven by the turbo-engine, a return pipe for excess fuel delivered by said pump, said return pipe being disposed in parallel with said pump, pressure regulating means located in said return pipe, and at least one driving unit located in said return pipe downstream from said pressure regulating means and arranged to be driven by excess fuel flowing through said return pipe, said driving unit being drivingly connected to said drive shaft of said pump.

2. A fuel supply circuit according to claim 1, wherein said driving unit is a turbine.

3. A fuel supply circuit according to claim 1, wherein said driving unit is mounted directly on said drive shaft of said displacement pump.

4. A fuel supply circuit according to claim 1, further comprising a gear box through which said pump drive shaft is arranged to be driven by said turbo-engine, and said driving unit is drivingly connected to said pump drive shaft also through said gear box.

* * * * *

UNITED STATES PATENT AND TRADEMARK OFFICE
CERTIFICATE OF CORRECTION

PATENT NO. : 5,156,001

DATED : October 20, 1992

INVENTOR(S) : Pierre C. Mouton

It is certified that error appears in the above-identified patent and that said Letters Patent is hereby corrected as shown below:

Title page, the TITLE should read "FUEL SUPPLY CIRCUIT FOR A TURBO-ENGINE".

Column 1, line 2, the TITLE should read "FUEL SUPPLY CIRCUIT FOR A TURBO-ENGINE".

Column 1, line 49, change "ben" to --been--.

Signed and Sealed this

Second Day of November, 1993

Attest:

BRUCE LEHMAN

*Attesting Officer*  Commissioner of Patents and Trademarks